(12) United States Patent
De Laet et al.

(10) Patent No.: US 12,305,743 B2
(45) Date of Patent: May 20, 2025

(54) ASSEMBLING AND DISSEMBLING DEVICE

(71) Applicant: ZF FRIEDRICHSHAFEN AG, Friedrichshafen (DE)

(72) Inventors: Wim De Laet, Antwerp (BE); Wim Michielsen, Wommelgem (BE); Quinten Gaethofs, Houthalen (BE); Ralf Sperlich, Witten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/578,742

(22) PCT Filed: Jul. 18, 2022

(86) PCT No.: PCT/EP2022/070027
§ 371 (c)(1),
(2) Date: Jan. 12, 2024

(87) PCT Pub. No.: WO2023/020757
PCT Pub. Date: Feb. 23, 2023

(65) Prior Publication Data
US 2024/0318713 A1     Sep. 26, 2024

(30) Foreign Application Priority Data

Aug. 17, 2021   (DE) .................. 10 2021 208 984.4

(51) Int. Cl.
*F16H 57/025*    (2012.01)
*F03D 15/00*    (2016.01)
(Continued)

(52) U.S. Cl.
CPC .......... *F16H 57/025* (2013.01); *F03D 15/00* (2016.05); *F03D 80/50* (2016.05); *F16H 2057/02078* (2013.01)

(58) Field of Classification Search
CPC ........ F16H 57/025; F16H 2057/02078; G01M 13/02–028; F03D 9/30; F03D 13/20;
(Continued)

(56) References Cited

U.S. PATENT DOCUMENTS 4,237,719 A * 12/1980 Takano ............... G01M 13/023
73/114.77
5,507,605 A * 4/1996 Bae ........................ B23B 41/00
269/21
(Continued)

FOREIGN PATENT DOCUMENTS

CN    109774968 A  *  5/2019
CN    111060312 A  *  4/2020  .......... G01M 13/027
(Continued)

OTHER PUBLICATIONS

Translation of CN111060312A, obtained from fit database (Year: 2019).*

*Primary Examiner* — Thomas C Diaz
(74) *Attorney, Agent, or Firm* — LEYDIG, VOIT & MAYER, LTD.

(57) ABSTRACT

An arrangement including a housing part, a second housing part, a first guide anchor, a second guide anchor, and at least one guide rail. The guide anchors engage form-fittingly and displaceably with the guide rail. The first guide anchor is rigidly fixed to the first housing part and the second guide anchor is rigidly fixed to the second housing part.

7 Claims, 1 Drawing Sheet

(51) Int. Cl.
*F03D 80/50* (2016.01)
*F16H 57/02* (2012.01)

(58) Field of Classification Search
CPC ...... F03D 80/50; F03D 80/501; F03D 80/504; B66C 23/207
See application file for complete search history.

(56) References Cited

U.S. PATENT DOCUMENTS

| | | | |
|---|---|---|---|
| 7,789,252 B2 * | 9/2010 | Dehlsen | B66C 17/00 |
| | | | 212/226 |
| 7,895,744 B2 * | 3/2011 | Numajiri | F03D 80/50 |
| | | | 254/335 |
| 8,721,258 B2 * | 5/2014 | Eriksen | B66C 23/207 |
| | | | 415/4.5 |
| 10,508,643 B2 * | 12/2019 | Hansen | F03D 15/00 |
| 2018/0335023 A1 | 11/2018 | Trede | |
| 2019/0277393 A1 | 9/2019 | Hasan et al. | |
| 2020/0362824 A1 * | 11/2020 | Kofman | F03D 13/40 |

FOREIGN PATENT DOCUMENTS

| | | |
|---|---|---|
| CN | 211343235 U | 8/2020 |
| DE | 102011122432 A1 | 6/2013 |
| EP | 3150849 A1 | 4/2017 |
| WO | WO 2009074859 A2 | 6/2009 |
| WO | WO 2019042508 A1 | 3/2019 |

* cited by examiner

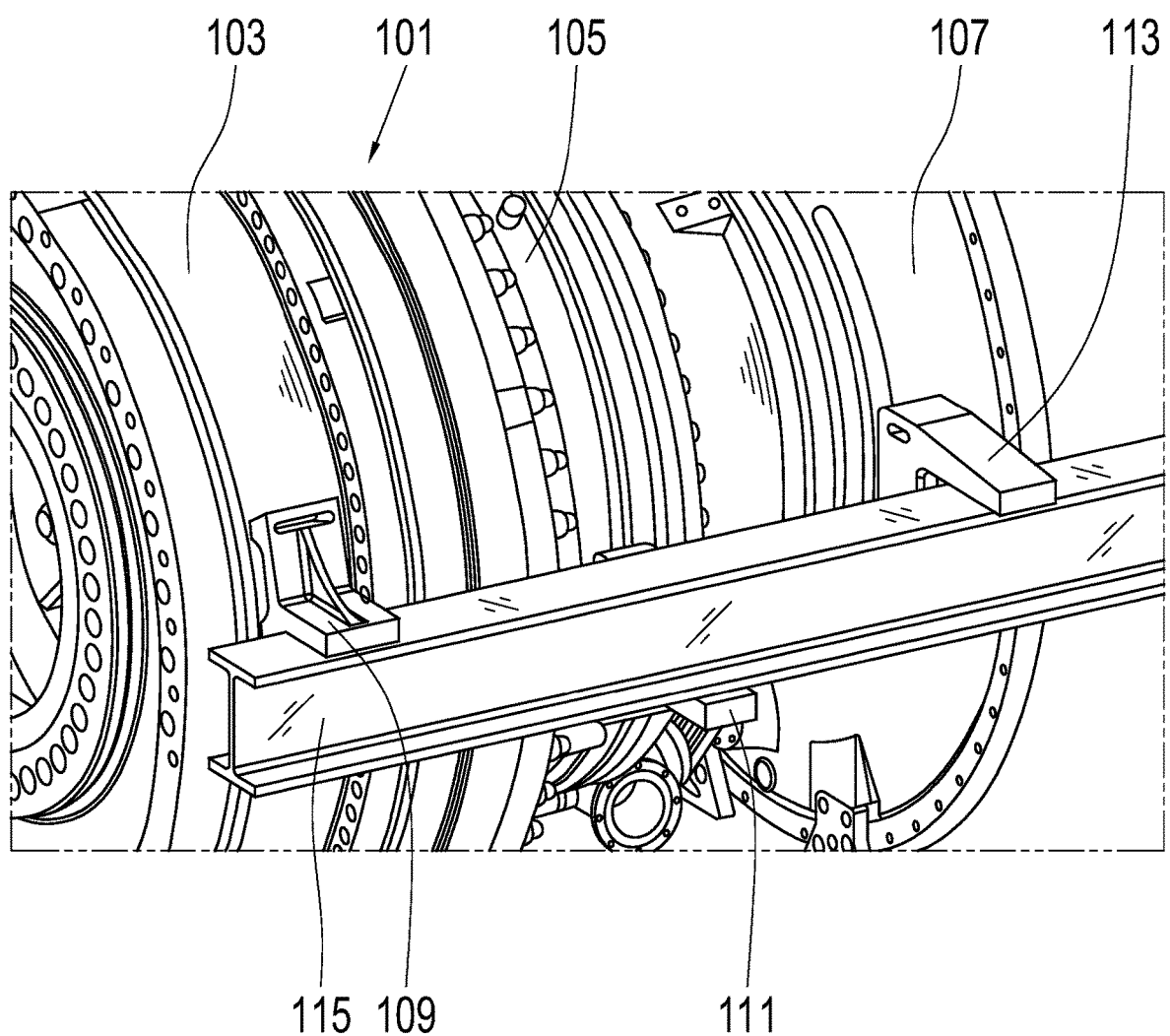

ASSEMBLING AND DISSEMBLING DEVICE

CROSS REFERENCE TO RELATED APPLICATIONS

This application is a U.S. National Phase application under 35 U.S.C. § 371 of International Application No. PCT/EP2022/070027, filed on Jul. 18, 2022, and claims benefit to German Patent Application No. DE 10 2021 208 984.4, filed on Aug. 17, 2021. The International Application was published in German on Feb. 23, 2023 as WO 2023/020757 A1 under PCT Article 21(2).

FIELD

The invention relates to an assembling and dissembling arrangement.

BACKGROUND

From EP 3 150 849 A1 a device is known, with which the drivetrain of a wind turbine can be moved in the nacelle for repair and maintenance purposes. Therein the drivetrain is moved on rails by hydraulic guide anchors.

SUMMARY

In an embodiment, the present disclosure provides an arrangement comprising a housing part, a second housing part, a first guide anchor, a second guide anchor, and at least one guide rail. The guide anchors engage form-fittingly and displaceably with the guide rail. The first guide anchor is rigidly fixed to the first housing part and the second guide anchor is rigidly fixed to the second housing part.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 illustrates a positioning device for housing parts.

DETAILED DESCRIPTION

In an embodiment, the present invention simplifies the repair and maintenance of the drivetrain of a wind turbine.

An arrangement according to an embodiment of the invention comprises a first housing part and a second housing part. The two housing parts each form a housing, such as a gearbox housing or a generator housing, in one or more pieces with one or more further housing parts. They can be part of the same housing or belong to different housings. For example, they can be parts of a gearbox housing, parts of a generator housing, or a part of a gearbox housing and a part of a generator housing. The gearbox and the generator preferably belong to the drivetrain of a wind turbine.

The arrangement further comprises a first guide anchor, a second guide anchor, and at least one guide rail. The guide anchors designate means for guiding the first housing part or the second housing part relative to the guide rail. The guide rail, in turn, is an elongated component suitable for guiding the guide anchors. In particular, it can be a one-piece component whose cross-section is invariable along the course of the guide rail. Preferably, the guide rail runs axially with regard to the drivetrain, i.e. parallel to a longitudinal axis of the drivetrain. The longitudinal axis of the drivetrain coincides with the axes of rotation of the drivetrain shafts. A double-T profile, for example, is suitable as a guide rail.

The guide anchors engage form-fittingly and displaceably with the guide rail. In particular, the guide anchors can be displaced in the longitudinal direction of the guide rail, i.e. along its course. Orthogonally to this, the guide anchors are preferably fixed in a non-displaceable manner by the form fit.

According to an embodiment of the invention, the first guide anchor is fixed rigidly, i.e. without the possibility of relative movement, to the first housing part, while the second guide anchor is fixed rigidly to the second housing part. The rigid fixing of the guide anchors results in a defined position of the two housing parts orthogonally to the longitudinal direction of the guide rail and in the radial direction respectively. In particular, this fixes the position of the two housing parts relative to each other orthogonally to the longitudinal direction of the guide rail and/or in the radial direction. This allows the guide rail to be used as a positioning aid for assembling or disassembling the two housing parts. The rigid configuration of the guide anchors makes the assembly and handling of the arrangement comparatively simple.

Since the guide anchors are rigid, they can be configured as simple one-piece components. For ease of displacement relative to the guide rail, they are preferably mounted with rollers in the guide rail.

The fixing of the guide anchors to the respective housing part is preferably detachable, so that the guide anchors can be removed after the assembly has taken place. Thus the guide anchors, for example, can be screwed to the respective housing part.

It is possible to use several guide rails. This improves the positioning accuracy. In a preferred embodiment, however, only one guide rail is provided, in which the two housing parts are form-fittingly and displaceably fixed via the guide anchors. The two housing parts are thus each form-fittingly and displaceably fixed relative to exactly one guide rail by means of one or more guide anchors fixed rigidly to the respective housing part. This means that there is no further guide rail, to which the two housing parts are positively and displaceably fixed by means of guide anchors rigidly fixed to the respective housing part. The arrangement is particularly easy to handle thanks to the exactly one single guide rail.

The guide rail preferably serves exclusively for positioning the two housing parts, but not for supporting the housing parts. In this case, according to a preferred development, the guide rail is supported at least partially, preferably completely, by the guide anchors. The guide anchors thus absorb at least part of the weight force of the guide rail, preferably the entire weight force of the guide rail. The guide anchors therefore transfer at least part, preferably all, of the weight of the guide rail to the two housing parts. The two housing parts therefore support the guide rail at least partially, preferably completely.

The further development eliminates the need to fix the guide rail in a support structure, for example, in the nacelle of a wind turbine. Since the guide rail does not have to support the housing parts, it can also be less stable and correspondingly lighter.

The first guide anchor, the second guide anchor and the guide rail form an assembly and disassembly device according to an embodiment of the invention.

A method according to an embodiment of the invention for assembling or disassembling an arrangement according to a preferred development provides that the guide anchors are fixed to the respective housing part. The first guide anchor is thus fixed to the first housing part. Correspondingly, the second guide anchor is fixed to the second housing part. Before, at the same time or following this, the guide anchors are brought into a form-fitting engagement with the guide rail. Finally, the first guide anchor and/or the second guide anchor are displaced relative to the guide rail. Due to the fixing of the guide anchors to the housing parts, this is accompanied by a displacement of the first housing part and/or the second housing part.

In a preferred development of the method, the first housing part and/or the second housing part are not held by the guide rail, but instead by a separate lifting or handling device. A crane, for example, is used as the lifting or handling device.

A method according to an embodiment of the invention for manufacturing a housing part for an arrangement according to a preferred embodiment, i.e. for manufacturing the first housing part or second housing part described above, provides that a receptacle for the respective guide anchor and a receptacle for a further means are manufactured in the same clamping arrangement. This implies that the housing part has at least one receptacle for a guide anchor and at least one receptacle for the further means.

The receptacle for the guide anchor designates a fixing device for the guide anchor. The guide anchor can therefore be fixed rigidly to the housing part in the receptacle.

The receptacle for the further means designates a fixing device for the further means. The further means can be, for example, a bearing, a gear wheel, for example, a ring gear of a planetary gearbox, or a further housing part.

In order to manufacture the housing part according to an embodiment of the invention, it is clamped on a manufacturing machine. Without releasing the clamping arrangement, the receptacle for the guide anchor and the receptacle for the further means are manufactured. In particular, both receptacles can be manufactured with the same machine.

By manufacturing in the same clamping arrangement according to an embodiment of the invention, it is possible to position the receptacle for the guide anchor relative to the further means particularly precisely. This in turn has the advantage of particularly precise positioning of the housing parts relative to the guide rail and thus also relative to each other.

FIG. 1 shows a gearbox housing 101 of a wind turbine. The housing thereof includes a plurality of housing parts screwed together-a first housing part 103, a second housing part 105, and a third housing part 107.

A first guide anchor 109 is attached to the first housing part 103. Correspondingly, a second guide anchor 111 is attached to the second housing part 105 and a third guide anchor 113 to the third housing part 107. All three guide anchors 109, 111, 113 engage form-fittingly with a guide rail 115. This allows the housing 101 to be displaced along the guide rail 115, orthogonally to the longitudinal direction of the guide rail 115. A position of the housing parts 103, 105, 107 orthogonally to the longitudinal direction of the guide rail 115 is thereby defined by the respective guide anchor 109, 111, 113. This position is invariable and independent of the position of the respective housing part 103, 105, 107 relative to the guide rail 115 in the longitudinal direction thereof.

If the gearbox 101 is to be interlocked with a generator, a housing of the generator is provided with guide anchors analogous to the housing of the gearbox, the anchors engaging form-fittingly with the guide rail 115. The guide rail 115 then positions the housing of the gearbox and the housing of the generator relative to each other such that they can be slid and screwed together in the longitudinal direction of the guide rail 115. Also, the gearbox and the generator can be separated from each other by means of the guide rail 115 by displacement in the opposite direction for maintenance and repair purposes.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 gearbox
103 first housing part
105 second housing part
107 third housing part
109 first guide anchor
111 second guide anchor
113 third guide anchor
115 guide rail

The invention claimed is:

1. An arrangement comprising:
a first housing part;
a second housing part;
a first guide anchor;
a second guide anchor; and
exactly one guide rail,
wherein the guide anchors engage form-fittingly and displaceably with the guide rail,
wherein the first guide anchor is rigidly fixed to the first housing part and the second guide anchor is rigidly fixed to the second housing part, wherein the first housing part and the second housing part form part of a wind turbine gearbox housing or a wind turbine generator housing, and wherein the form-fitting engagement of the first guide anchor and the second guide anchor to the guide rail is configured to provide for displacement of the first guide anchor and the second guide anchor along a longitudinal direction of the guide rail and to prevent displacement of the first guide anchor and the second guide anchor relative to the guide rail in a direction orthogonal to the longitudinal direction of the guide rail.

2. The arrangement according to claim 1, wherein the guide rail is at least partially supported by the guide anchors.

3. A method of assembling or disassembling the arrangement according to claim 1, the method comprising:
   fixing the guide anchors to a respective housing part of the first and second housing parts;
   engaging the guide anchors with the guide rail; and
   displacing the first guide anchor and/or the second guide anchor relative to the guide rail.

4. The method according to claim 3, wherein
   the first housing part and/or the second housing part are held by a crane.

5. A method of claim 3, further comprising attaching the first housing part and/or the second housing part to the wind turbine gearbox housing or the wind turbine generator housing after displacing the first guide anchor and/or the second guide anchor relative to the guide rail.

6. The arrangement according to claim 1, wherein the first guide anchors and the second guide anchor include rollers.

7. The arrangement according to claim 1, wherein the guide rail is an I-beam.

* * * * *